United States Patent

De Haan et al.

[11] Patent Number: 5,657,401
[45] Date of Patent: Aug. 12, 1997

[54] METHOD AND APPARATUS FOR MEASURING NOISE USING A PLURALITY OF NOISE ESTIMATES

[75] Inventors: Gerard De Haan; Tatiana G. Kwaaitaal-Spaasova; Olukayode A. Ojo, all of Eindhoven, Netherlands

[73] Assignee: U.S. Philips Corporation, New York, N.Y.

[21] Appl. No.: 393,751

[22] Filed: Feb. 24, 1995

[30] Foreign Application Priority Data

Mar. 7, 1994 [EP] European Pat. Off. ............. 94200556

[51] Int. Cl.$^6$ .................... G06K 9/40; G06K 9/38
[52] U.S. Cl. .................. 382/275; 382/260; 382/271; 382/273; 382/272; 348/607
[58] Field of Search .................. 382/108, 260–265, 382/270–275; 348/246, 615, 618, 620, 407, 416, 420, 413, 607

[56] References Cited

U.S. PATENT DOCUMENTS

| 4,908,875 | 3/1990 | Assael et al. ............. 382/272 |
| 5,086,485 | 2/1992 | Lin ............................. 382/272 |
| 5,245,677 | 9/1993 | Lepore et al. .............. 382/275 |
| 5,440,344 | 8/1995 | Asamura et al. .......... 348/420 |

FOREIGN PATENT DOCUMENTS 61-116911  5/1986  Japan .

OTHER PUBLICATIONS

"Video Noise Reduction", by J.O. Drewery, R. Storey and N.E. Tanton, BBC RD 1984/7, Section 7.3.

Primary Examiner—Leo Boudreau
Assistant Examiner—Bhavesh Mehta
Attorney, Agent, or Firm—Edward W. Goodman

[57] ABSTRACT

In a method of measuring noise in image signals, a number of noise estimates (SAD) is calculated (1). Subsequently, it is determined (3–9) which noise estimation interval [A, B] out of a plurality of predetermined noise estimation intervals [A, B] contains at least a predetermined number of noise estimates (SAD) and has at the same time the lowest upper interval boundary. The output noise measurement value depends on the determined noise estimation interval.

9 Claims, 2 Drawing Sheets

METHOD AND APPARATUS FOR MEASURING NOISE USING A PLURALITY OF NOISE ESTIMATES

BACKGROUND OF THE INVENTION

Field of the Invention

The invention relates to a method and apparatus for noise measurement.

The BBC report Video Noise Reduction, by J. O. Drewory, R. Storey and N. E. Tanton, BBC RD 1984/7, section 7.3, discloses a method of noise measurement which is based on the assumption that the lowest value, or minimum, of an output signal of a spatial filter represents the noise level. In the absence of motion, the actual minimum obtained will obviously depend on how many samples are taken at a time. The more samples are taken, the lower the value obtained. In practice, a compromise is achieved by minimization throughout a television line and averaging 256 such line values to give a measurement once per field. This implies that somewhere in each line there is a region of no motion.

JP patent application No. 61-116,911, filed on 20.05.86, discloses a noise reducer using magnitude of noise and signal processing. A level difference detecting circuit receives a digital image signal and detects, in a digital manner the absolute value of the level difference between an image signal of one sample which is currently being inputted and an image signal of one sample which was inputted one sample before, and outputs a digital signal corresponding to the absolute value of the level difference. An integrating circuit integrates, in a digital manner, the output signal of the level difference detecting circuit in response to a period setting signal during a constant level period which exists in every field of the image signal. Together with the level difference detecting circuit, the integrating circuit constitutes a noise detecting means.

A noise measuring method which uses the signal energy in the horizontal or vertical blanking interval has the disadvantage that at several places in the chain from camera to display, new (clean) blanking signals can (and will) be inserted to facilitate clamping in later stages in the chain. Another problem is the emergence of new data services (e.g., teletext) and additional augmentation signals (DATV, etc.) occupying the assumed free blanking space in the image signal.

SUMMARY OF THE INVENTION

It is, inter alia, an object of the invention to provide a more reliable method and apparatus for noise measurement. To this end, a first aspect of the invention provides a method of measuring noise in image signals, comprising the steps of calculating a number of noise estimates; and determining which noise estimation interval out of a plurality of predetermined noise estimation intervals contains at least a predetermined number of noise estimates and has at the same time the lowest upper interval boundary, an output noise measurement value depending on the determined noise estimation interval. A second aspect of the invention provides an apparatus for measuring noise in image signals comprising means for calculating a number of noise estimates; and means for determining which noise estimation interval out of a plurality of predetermined noise estimation intervals contains at least a predetermined number of noise estimates and has, at the same time, the lowest upper interval boundary, an output noise measurement value depending on the determined noise estimation interval.

In a preferred embodiment, a (preferably large) number of estimates of the noise is calculated for every picture period. For example, such an estimate is obtained by summing absolute differences between current pixel values and delayed pixel values over a predetermined small area. Several intervals are defined within the total range of possible estimates, each interval relating to a certain output noise figure. The interval which contains at least a predefined number of estimates and is, at the same time, the lowest in the range, determines the current output noise figure.

Accordingly, it is possible to measure the noise in the video signal itself in order to eliminate the aforementioned disadvantages.

These and other aspects of the invention will be apparent from and elucidated with reference to the embodiments described hereinafter.

DESCRIPTION OF THE PREFERRED EMBODIMENTS

Figure 1:
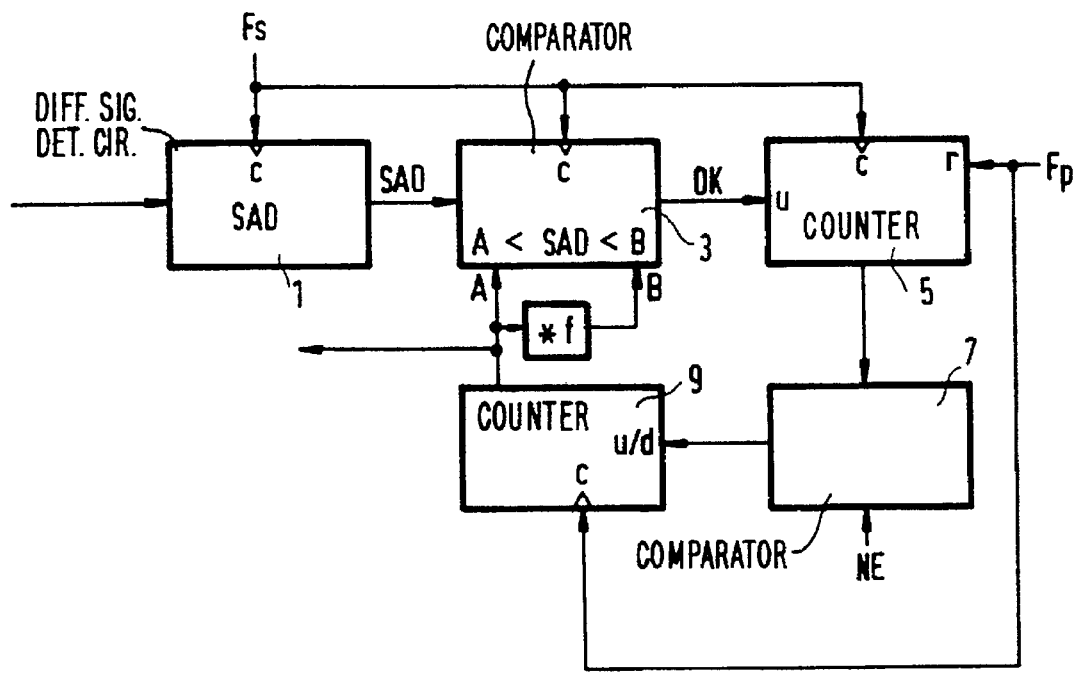
FIG. 1 shows a noise measurement circuit in accordance with a first embodiment of the present invention.
Figure 2:
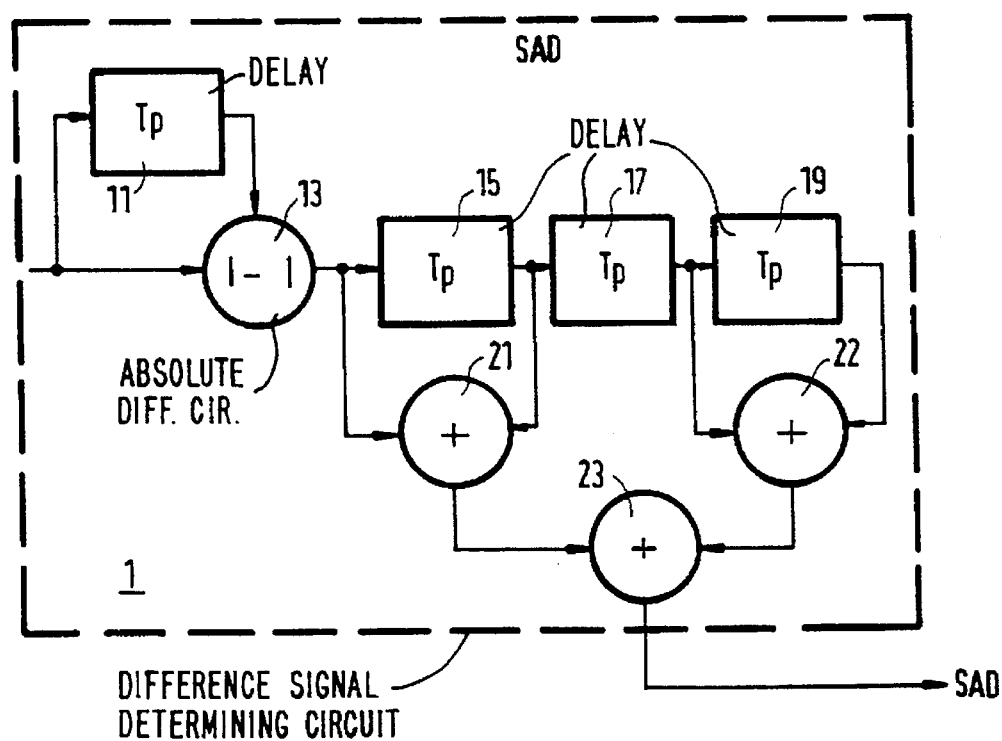
FIG. 2 shows a difference signal determining circuit for use in the embodiment of FIG. 1.

In the noise measurement circuit of FIG. 1, an input image signal is applied to a difference signal determining circuit 1. One possible embodiment of the difference signal determining circuit 1 is shown in FIG. 2. For each block out of a large number (e.g., 175,000) of small blocks of pixels, a difference signal SAD (sum of absolute differences) is obtained. The difference signal SAD can be considered as an estimate of the noise. The difference signal SAD is applied to a comparator 3, which determines whether the difference signal SAD is wig an interval determined by boundaries A and B applied to interval boundary inputs of the comparator 3. If the comparator 3 finds that the difference signal SAD lies within the interval [A, B], a count of a counter 5 is increased. The counter 5 is reset once per picture period by a picture frequency signal Fp. If the noise is not to be determined once per picture period but once per other period (e.g., field period, or a number of field periods), a suitably adapted reset signal has to be applied to the counter 5. The difference determining circuit 1, the comparator 3 and the counter 5 receive a clock signal of the sample frequency Fs. The count of the counter 5 is compared in a comparator 7 with a predetermined number NE. NE is an experimentally optimized, predefined integral value. Good results are obtained with NE=496, which is 0.28% of the total number of blocks. A count of a counter 9 is decreased if the count of the counter 5 exceeds the number NE, whereas the count of a counter 9 is increased if the count of the counter 5 falls below the number NE. To this end, a comparison output of the comparator 7 is connected to an up/down input of the counter 9. The counter 9 is clocked by the signal by which the counter 5 is reset, viz. the picture frequency signal Fp. A count of the counter 9 forms the noise measurement result. This count also constitutes the lower boundary A of the interval comparator 3, while an output of a multiplier, which determines the multiple f*A, constitutes the upper boundary of the interval comparator 3. Preferably, f equals 1.5. Alternatively, the upper boundary equals the sum of the lower boundary and a fixed offset.

The embodiment shown in FIG. 1 is a very simple way of determining which noise estimation interval out of a plurality of predetermined noise estimation intervals contains at least a predetermined number of noise estimates SAD and has, at the same time, the lowest upper interval boundary B, an output noise measurement value depending on the determined noise estimation interval. Of course, other embodiments can be conceived as well. Whereas in the embodiment shown, both interval boundaries A, B depend on the output of the counter 9, it is also possible to have a fixed lower boundary A (e.g., zero or a small positive value) with only the upper boundary B depending on the output of the counter 9.

FIG. 2 shows an embodiment of the difference signal determining circuit 1. The input image signal is applied to a delay element 11 for a delay by a pixel period, assuming that the difference signal SAD is to be based on the difference between horizontally adjacent pixels. If the difference signal is to be based on the difference between vertically adjacent pixels, the delay element 11 should be a line delay; a field delay would correspond to temporally adjacent pixels. The absolute value of the difference between the input and the output of the delay element 11 is determined by an absolute difference circuit 13, whose output is coupled to cascade-connected pixel delay elements 15, 17, 19. The output signals of the absolute difference circuit 13 and the pixel delay elements 15, 17, 19 are summed by adders 21–23 to obtain the difference signal applied to the comparator 3 shown in FIG. 1. Any other configuration of adders yielding the same result is also possible.

To arrive at the largest number of noise estimates, the difference signal SAD should either be calculated for the smallest possible group of pixels, or the groups of pixels should be partially overlapping. The smallest possible group of pixels consists of a single pixel, in which case, the difference signal SAD is calculated between this pixel and a neighboring pixel. This possible embodiment has the disadvantage that the noise estimate (especially for low noise levels) is disturbed by the quantization of the luminance signal. Therefore, a better result is obtained with a group of M pixels, M being an integer larger than one, realizing the same number of noise estimates as before by defining the groups in such a way that they have M–1 pixels in common with their neighboring groups. In an eight-bit environment, M=4 with four pixels neighbouring on one image line, turned out to be very suitable.

Figure 3:
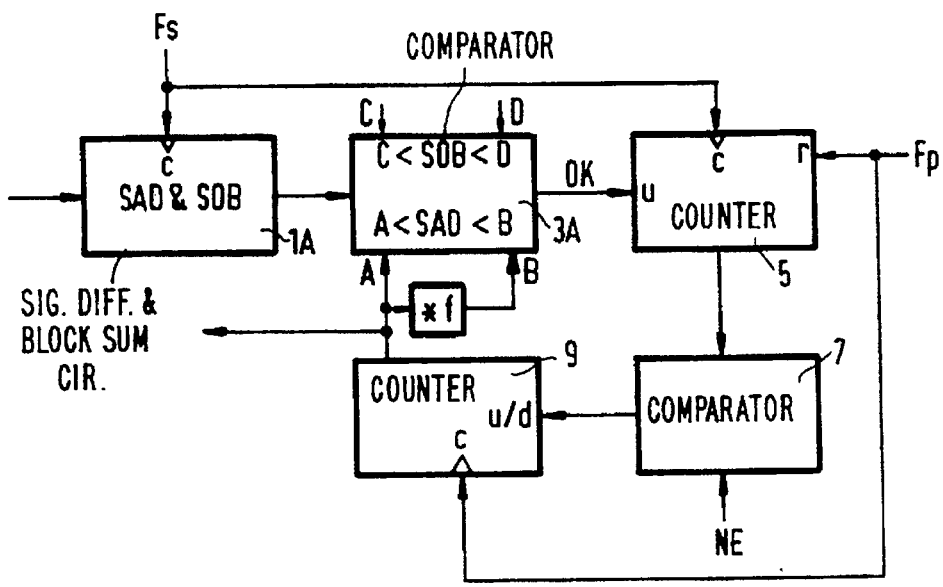
FIG. 3 shows a noise measurement circuit in accordance with a second embodiment of the present invention.

FIG. 3 shows a noise measurement circuit in accordance with a second embodiment of the present invention, which is based on the following considerations. It was found that clipping of the luminance signal in extremely bright or extremely dark areas of the image can negatively influence the quality of the noise estimation accuracy. To improve the performance in these situations, a new variable is defined, viz., the sum of the luminance values over all pixels in the block (SOB), and the count of the counter 5 is only increased when both the difference signal lies within the above-mentioned interval [A, B] and the signal SOB lies within an interval [C, D]. It appeared that the lower and upper interval boundaries C, D are not critical, i.e., their precise values are irrelevant as long as they are chosen to be such that extremely dark and extremely bright areas of the image no longer affect the operation of the noise measurement circuit. In one embodiment in which each block has 4 pixels and the pixels are expressed in 8 bits, the values C and D are set at 100 and 960, respectively. The use of the signal SOB has the additional advantage that it is no longer necessary to know where the horizontal and vertical blanking intervals are situated, or whether a letterbox signal is transmitted having a central image with a 14:9 or 16:9 aspect ratio, because all non-image parts are outside the interval [C, D] and are thus automatically eliminated from the noise measurement without any gating pulses being necessary. While, in the preferred embodiment, the same threshold NE is used as in the embodiment shown in FIG. 1, it is possible to adapt the threshold NE if a large number of blocks is excluded, by the use of the additional constraint that the signal SOB lies within the interval [C, D].

The embodiment of FIG. 3 largely corresponds to that of FIG. 1, the differences being:

the replacement of the difference calculating circuit 1 by a circuit 1A which calculates both the difference signal SAD and the signal SOB; and the replacement of the comparator 3 by a double comparator 3A which only causes an increase of the count of the counter 5 if both the difference signal SAD is within the interval [A, B] and the signal SOB is within the interval [C, D].

Figure 4:
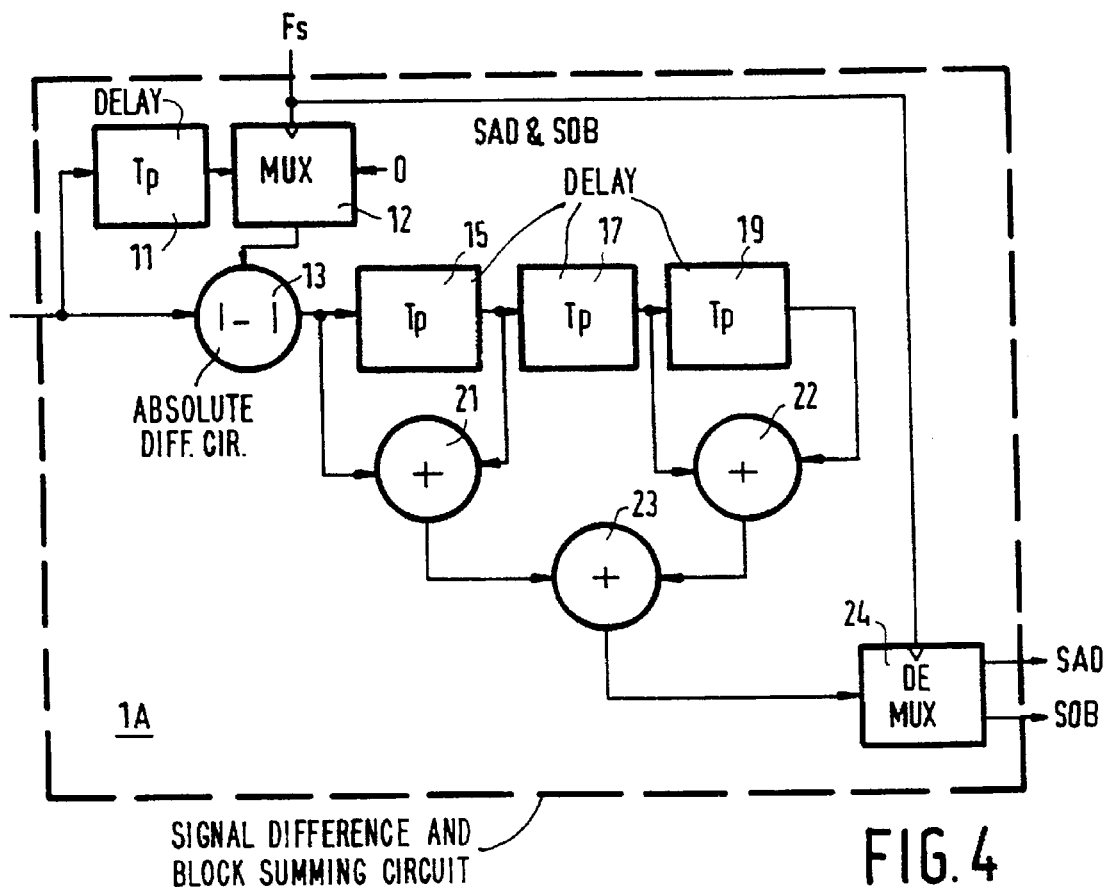
FIG. 4 shows a difference signal determining circuit for use in the embodiment of FIG. 3.

FIG. 4 shows an embodiment of the circuit 1A for calculating both the difference signal SAD and the signal SOB. The embodiment of FIG. 4 largely corresponds to that of FIG. 2, the differences being:

the insertion of a multiplexer 12 applying either the output of the delay element 11 or a zero signal to the absolute difference circuit 13; and the insertion of a demultiplexer 24 at the output of the adder 23 for furnishing either the difference signal SAD or the signal SOB. The multiplexer 12 and the demultiplexer 24 are synchronously switched over by a signal of the pixel frequency Fs.

It should be noted that the above-mentioned embodiments illustrate rather than limit the invention, and that those skilled in the art will be able to design many alternative embodiments without departing from the scope of the appended claims. For example, FIGS. 1, 3 show recursive embodiments in which the noise measurement signal controls the interval boundaries A, B. It is also possible to have a small number of parallel processing paths each containing the elements 3–7, each path having its own set of fixed interval boundaries A, B. The path having at the same time the lowest upper boundary B and at least a predetermined number of noise estimates (difference signals SAD) indicates the noise level in the image signal. If eight parallel paths are used, the result is completely comparable to the embodiments of FIG. 1, 3 if the counter 9 is a three-bit counter. It will, however, be evident that the noise measurement loops shown in FIGS. 1, 3 require much fewer elements than an embodiment requiring several parallel paths.

In a modification of the invention, in which noise is only measured in relatively flat areas, the number NE is replaced by a threshold Th, preferably being (T-20.000)/128 with T being the total number of blocks which belong to flat areas. In the embodiment of FIG. 3, flat areas can, for example, be defined as those areas for which it holds that the absolute value of the difference between the sum SOB divided by the number of pixels for which the sum SOB is calculated, on the one hand, and the currently received pixel, on the other hand, falls below a threshold equal to e.g., 5 least significant bits.

A preferred embodiment of the invention is adapted to the possibility that standard aspect-ratio (4:3) pictures are displayed on wide-screen (16:9) receivers with at least the possibility of switching the display of the 4:3 picture between a first, non-expanded display with bars at the left and right sides of the picture and a second display in which the picture is expanded so as to fill the full width of the screen. Preferably, many in-between displays are also possible. The adaptation of the invention is based on the recognition that for obtaining the first, non-expanded display of the 4:3 picture, the picture signal has to be compressed because the line period of the full width of the screen is identical to the line period of the received signal. This compression results in an increased amount of high frequencies in comparison to 16:9 pictures or an expanded display of 4:3 pictures. Without adaptation, this increased amount of high frequencies might be misinterpreted as noise. Preferably, the value NE depends on the compression ratio as follows. No compression (compression factor 1) means that there are 720 active pixels on a line, which number is reduced when compression is applied. A compression factor 2 would result in only 360 active pixels. A "compression factor" smaller than 1 means that the picture is zoomed. The number of active pixels is divided by 32; the quotient is diminished by 8. The result is used as an index to the following list of values for NE:

56, 154, 72, 80, 96, 120, 160, 200, 216, 256, 304, 352, 400, 496, 600, 720, 960, 1200, 1400, 1600.

In an alternative embodiment, the noise estimates SAD are reduced (increased) by an amount which depends on the compression (zoom) ratio. An adaptation of the value NE can, however, adapted in a very simple way.

In a further modification of the invention, the image signal is subjected to a peaking operation, and the value (NE) is adapted to the peaking applied to the image signal. Again, it is also possible to reduce the noise estimates by an mount which depends on the peaking applied to the image signal, but an adaptation of the value NE is simpler.

In yet another modification of the invention, which is particularly suitable when also virtually noise-free signals from optical recording media have to be processed, once per second it is tested whether a zero-noise "interval" contains at least the predetermined number of noise estimates. If so, the counter 9 is reset. The counter 9 may be a 3-bit counter. The comparators 3, 3A may check whether A≦SAD≦B instead of A<SAD<B as shown in. FIGS. 1, 3. The noise measurement result output of counter 9 may be applied to a median filter to mitigate undesired jumps in this result which are caused by resets of the counter 9. The median filter may have 3 inputs which are connected to an input, a middle tap and an output of a delay line having 4 pixel delays. The median filter output may be applied to a recursive filter for mixing new and old information in the ratio 1:15. The delay element of the recursive filter, e.g., a pixel delay, may be reset if the counter 9 is reset.

We claim:

1. A method of measuring noise in image signals, comprising the steps of:

calculating a number of noise estimates;

determining which noise estimation interval out of a plurality of predetermined noise estimation intervals contains at least a predetermined number of noise estimates and has, at the same time, a lowest upper interval boundary; and generating an output noise measurement value depending on the determined noise estimation interval, wherein said determining step includes:

comparing each of said number of noise estimates with a current upper interval boundary;

counting a number of times that said noise estimates is below said current upper interval boundary thereby forming a first count signal;

comparing said first count signal with a predetermined value thereby forming a comparison signal;

modifying a second count signal by said comparison signal; and deriving a new upper interval boundary from said modified second count signal.

2. An apparatus for measuring noise in image signals, comprising:

means for calculating a number of noise estimates;

means for determining which noise estimation interval out of a plurality of predetermined noise estimation intervals contains at least a predetermined number of noise estimates and has, at the same time, a lowest upper interval boundary; and means for generating an output noise measurement value depending on the determined noise estimation interval, characterized in that said determining means comprises:

means for comparing each of said number of noise estimates with a current upper interval boundary;

means for counting a number of times that said noise estimates is below said current upper interval boundary, thereby forming a first count signal;

means for comparing said first count signal with a predetermined value, thereby forming a comparison signal;

means for modifying a second count signal using said comparison signal; and means for forming a new upper interval boundary from said modified second count signal.

3. An apparatus as claimed in claim 2, wherein said calculating means comprises:

means for delaying an input image signal to furnish a delayed signal; and means for determining a difference signal on the basis of said input image signal and said delayed signal, said difference signal being the noise estimate.

4. An apparatus as claimed in claim 3, wherein said difference signal determining means comprises:

means for obtaining an absolute value of a difference between a sample of said input image signal and a sample of said delayed signal;

means for delaying said absolute value over a predetermined number of pixel periods to obtain a plurality of absolute value signals; and means for summing said absolute value signals to obtain said difference signal.

5. An apparatus as claimed in claim 2, wherein said image signal is subjected to a compression or zoom operation, and said predetermined value is adapted to a compression or zoom ratio with which the image signal is displayed.

6. An apparatus as claimed in claim 2, wherein noise is only measured for relatively flat areas in the image signal, and said predetermined value is adapted to the number of noise estimates in said relatively flat areas.

7. An apparatus as claimed in claim 2, wherein said image signal is subjected to a peaking operation, and said predetermined value is adapted to the peaking applied to the image signal.

8. An apparatus as claimed in claim 2, wherein said determining means comprises means for controlling said upper interval boundary in dependence upon said output noise measurement value.

9. An apparatus as claimed in claim 2, wherein said determining means comprises means for considering only those noise estimates which correspond to input image signal values within a predetermined range.

* * * * *